(12) United States Patent
Soltys et al.

(10) Patent No.: US 7,575,234 B2
(45) Date of Patent: Aug. 18, 2009

(54) WIRELESS MONITORING OF PLAYING CARDS AND/OR WAGERS IN GAMING

(75) Inventors: Richard Soltys, Mercer Island, WA (US); Richard Huizinga, Mercer Island, WA (US)

(73) Assignee: Bally Gaming, Inc., Las Vegas, NV (US)

( * ) Notice: Subject to any disclaimer, the term of this patent is extended or adjusted under 35 U.S.C. 154(b) by 858 days.

(21) Appl. No.: 10/823,051

(22) Filed: Apr. 13, 2004

(65) Prior Publication Data

US 2004/0207156 A1    Oct. 21, 2004

Related U.S. Application Data

(60) Provisional application No. 60/463,978, filed on Apr. 17, 2003.

(51) Int. Cl.
B23B 31/06 (2006.01)

(52) U.S. Cl. ............................... 273/149 R; 463/47

(58) Field of Classification Search ............. 273/149 R, 273/149 P; 463/16, 22, 40; 235/492–494
See application file for complete search history.

(56) References Cited

U.S. PATENT DOCUMENTS

| | | | |
|---|---|---|---|
| 1,034,402 A | 7/1912 | Hardy | |
| 1,727,800 A | 9/1929 | Albert | |
| 1,890,504 A | 12/1932 | Ferguson, Jr. | |
| 2,663,418 A | 12/1953 | Grunwald | 206/62 |
| 2,694,662 A | 11/1954 | Hunter, Jr. | 154/121 |
| 3,222,071 A | 12/1965 | Lang | 273/149 |
| 3,377,070 A | 4/1968 | Nottoli | 273/149 |
| 3,493,728 A | 2/1970 | Braden, Jr. et al. | |
| 3,561,756 A | 2/1971 | Barnett | 271/41 |
| 3,667,759 A | 6/1972 | Barr | 273/152.1 |
| 3,690,670 A | 9/1972 | Cassady et al. | 273/149 P |
| 3,740,742 A | 6/1973 | Thompson et al. | 340/280 |
| 3,751,041 A | 8/1973 | Seifert | 273/149 P |
| 3,752,962 A | 8/1973 | Greskovics | 235/61.11 D |
| 3,766,452 A | 10/1973 | Burpee et al. | 317/262 R |
| 3,810,172 A | 5/1974 | Burpee et al. | 343/5 PD |
| 3,814,436 A | 6/1974 | Boren | 273/149 P |
| 4,023,167 A | 5/1977 | Wahlstrom | 343/6.5 SS |
| 4,244,582 A | 1/1981 | Raees et al. | 273/293 |

(Continued)

FOREIGN PATENT DOCUMENTS

DE    44 39 502    9/1995

(Continued)

OTHER PUBLICATIONS

U.S. Appl. No. 60/887,092, filed Jan. 29, 2007, Shayesteh.

(Continued)

*Primary Examiner*—Peter DungBa Vo
*Assistant Examiner*—Alex F. R. P. Rada, II
(74) *Attorney, Agent, or Firm*—Andy M. Han; Frank Abramonte; Marvin A. Hein

(57) ABSTRACT

Playing cards carry conductive material which may be wirelessly interrogated via radio frequency transmission to identify a rank and/or suit for monitoring a card game. Chips carry conductive material which may be wirelessly interrogated via radio frequency transmission to identify a value for monitoring wagering in a card game.

10 Claims, 11 Drawing Sheets

U.S. PATENT DOCUMENTS

| | | | |
|---|---|---|---|
| 4,373,726 A | 2/1983 | Churchill et al. | 273/138 A |
| 4,377,285 A | 3/1983 | Kadlic | 273/148 A |
| 4,510,490 A | 4/1985 | Anderson, III et al. | 340/572 |
| 4,531,117 A | 7/1985 | Nourse et al. | 340/572 |
| 4,531,187 A | 7/1985 | Uhland | 364/412 |
| 4,534,562 A | 8/1985 | Cuff et al. | 273/149 P |
| 4,636,846 A | 1/1987 | Villareal | 358/100 |
| 4,656,463 A | 4/1987 | Anders et al. | 340/572 |
| 4,660,025 A | 4/1987 | Humphrey | 340/572 |
| 4,662,637 A | 5/1987 | Pfeiffer | 273/149 P |
| 4,667,959 A | 5/1987 | Pfeiffer et al. | 273/149 R |
| 4,693,480 A | 9/1987 | Smith | 273/296 |
| 4,725,079 A | 2/1988 | Koza et al. | 283/73 |
| 4,728,108 A | 3/1988 | Neuwahl | 273/296 |
| 4,746,830 A | 5/1988 | Holland | 310/313 D |
| 4,750,743 A | 6/1988 | Nicoletti | 273/148 A |
| 4,814,589 A | 3/1989 | Storch et al. | 235/375 |
| 4,817,528 A | 4/1989 | Baker | 101/395 |
| 4,822,050 A | 4/1989 | Normand et al. | 273/149 P |
| 4,832,341 A | 5/1989 | Muller et al. | 273/139 |
| 4,859,991 A | 8/1989 | Watkins et al. | 340/572 |
| 4,870,391 A | 9/1989 | Cooper | 340/572 |
| 4,885,700 A | 12/1989 | Kondziolka et al. | 364/519 |
| 4,920,335 A | 4/1990 | Andrews | 340/572 |
| 4,926,996 A | 5/1990 | Eglise et al. | 194/212 |
| 4,951,950 A | 8/1990 | Normand et al. | 273/149 P |
| 5,039,102 A | 8/1991 | Miller | 273/148 R |
| 5,053,612 A | 10/1991 | Pielemeier et al. | 235/462 |
| 5,067,713 A | 11/1991 | Soules et al. | 273/149 P |
| 5,103,234 A | 4/1992 | Watkins et al. | 343/742 |
| 5,110,134 A | 5/1992 | Laughlin et al. | 273/293 |
| 5,166,502 A | 11/1992 | Rendleman et al. | 235/492 |
| 5,186,464 A | 2/1993 | Lamle | 273/149 R |
| 5,199,710 A | 4/1993 | Lamle | 273/149 R |
| 5,224,712 A | 7/1993 | Laughlin et al. | 273/304 |
| 5,259,907 A | 11/1993 | Soules et al. | 156/277 |
| 5,283,422 A | 2/1994 | Storch et al. | 235/375 |
| 5,312,104 A | 5/1994 | Miller | 273/148 R |
| 5,361,885 A | 11/1994 | Modler | 194/214 |
| 5,362,053 A | 11/1994 | Miller | 273/148 R |
| 5,374,061 A | 12/1994 | Albrecht | 273/149 R |
| 5,397,133 A | 3/1995 | Penzias | 273/439 |
| 5,406,264 A | 4/1995 | Plonsky et al. | 340/572 |
| 5,416,308 A | 5/1995 | Hood et al. | 235/454 |
| 5,417,431 A | 5/1995 | Gluck | 273/293 |
| 5,431,399 A | 7/1995 | Kelley | 273/149 P |
| 5,518,249 A | 5/1996 | Sines et al. | 273/304 |
| 5,538,803 A | 7/1996 | Gambino et al. | 428/694 TM |
| 5,557,280 A | 9/1996 | Marsh et al. | 342/44 |
| 5,581,257 A | 12/1996 | Greene et al. | 342/51 |
| 5,605,334 A | 2/1997 | McCrea, Jr. | 273/309 |
| 5,613,680 A | 3/1997 | Groves et al. | 273/138.2 |
| 5,625,341 A | 4/1997 | Giles et al. | 340/572 |
| 5,632,483 A | 5/1997 | Garczynski et al. | 273/148 R |
| 5,651,548 A | 7/1997 | French et al. | 273/309 |
| 5,654,050 A | 8/1997 | Whalen-Shaw | 428/35.7 |
| 5,669,816 A | 9/1997 | Garczynski et al. | 463/12 |
| 5,676,376 A | 10/1997 | Valley | 273/288 |
| 5,681,039 A | 10/1997 | Miller | 273/148 R |
| 5,698,839 A | 12/1997 | Jagielinski et al. | 235/493 |
| 5,699,066 A | 12/1997 | Marsh et al. | 342/44 |
| 5,707,287 A | 1/1998 | McCrea, Jr. | 463/12 |
| 5,722,893 A | 3/1998 | Hill et al. | 463/47 |
| 5,735,525 A | 4/1998 | McCrea, Jr. | 273/309 |
| 5,735,742 A * | 4/1998 | French | 463/25 |
| 5,742,656 A | 4/1998 | Mikulak et al. | 377/7 |
| 5,754,110 A | 5/1998 | Appalucci et al. | 340/572 |
| 5,755,618 A | 5/1998 | Mothwurf | 453/17 |
| 5,757,876 A | 5/1998 | Dam et al. | 377/7 |
| 5,770,533 A | 6/1998 | Franchi | 463/42 |
| 5,772,505 A | 6/1998 | Garczynski et al. | 463/12 |
| 5,779,546 A | 7/1998 | Meissner et al. | 463/25 |
| 5,791,988 A | 8/1998 | Nomi | 463/11 |
| 5,803,808 A | 9/1998 | Strisower | 463/11 |
| 5,812,065 A | 9/1998 | Schrott et al. | 340/825.54 |
| 5,831,532 A | 11/1998 | Gambino et al. | 340/572 |
| 5,831,669 A | 11/1998 | Adrain | 348/143 |
| 5,847,650 A | 12/1998 | Zhou et al. | 340/572 |
| 5,871,400 A | 2/1999 | Yfantis | 463/22 |
| 5,895,048 A | 4/1999 | Smith, Jr. | 273/293 |
| 5,895,321 A | 4/1999 | Gassies et al. | 463/29 |
| 5,911,626 A | 6/1999 | McCrea, Jr. | 463/27 |
| 5,919,090 A | 7/1999 | Mothwurf | 463/25 |
| 5,941,769 A | 8/1999 | Order | 463/12 |
| 5,945,654 A | 8/1999 | Huang | 235/449 |
| 5,949,050 A | 9/1999 | Fosbenner et al. | 235/449 |
| 5,954,654 A | 9/1999 | Eaton et al. | 600/462 |
| 5,989,122 A | 11/1999 | Roblejo | 463/22 |
| 6,003,013 A | 12/1999 | Boushy et al. | 705/10 |
| 6,021,949 A | 2/2000 | Boiron | 235/492 |
| 6,029,891 A | 2/2000 | Freeman et al. | 235/380 |
| 6,039,650 A | 3/2000 | Hill | 463/47 |
| 6,042,150 A | 3/2000 | Daley | 283/86 |
| 6,093,103 A | 7/2000 | McCrea, Jr. | 463/27 |
| 6,117,012 A | 9/2000 | McCrea, Jr. | 463/27 |
| 6,126,166 A | 10/2000 | Lorson et al. | 273/148 R |
| 6,145,838 A | 11/2000 | White | 273/295 |
| 6,149,154 A | 11/2000 | Grauzer et al. | 273/149 R |
| 6,165,069 A | 12/2000 | Sines et al. | 463/12 |
| 6,166,763 A | 12/2000 | Rhodes et al. | 348/143 |
| 6,186,895 B1 | 2/2001 | Oliver | 463/25 |
| 6,193,607 B1 | 2/2001 | Kay | 463/22 |
| 6,196,547 B1 | 3/2001 | Pascal et al. | 273/292 |
| 6,217,447 B1 | 4/2001 | Lofink et al. | 463/12 |
| 6,250,632 B1 | 6/2001 | Albrecht | 273/149 R |
| 6,254,096 B1 | 7/2001 | Grauzer et al. | 273/149 R |
| 6,254,484 B1 | 7/2001 | McCrea, Jr. | 463/27 |
| 6,264,109 B1 | 7/2001 | Chapet et al. | 235/492 |
| 6,267,248 B1 | 7/2001 | Johnson et al. | 209/547 |
| 6,267,671 B1 | 7/2001 | Hogan | 463/25 |
| 6,293,864 B1 | 9/2001 | Romero | 463/12 |
| 6,299,534 B1 | 10/2001 | Breeding et al. | 463/25 |
| 6,299,536 B1 | 10/2001 | Hill | 463/47 |
| 6,307,473 B1 | 10/2001 | Zampini et al. | 340/572.1 |
| 6,313,871 B1 | 11/2001 | Schubert | 348/143 |
| 6,346,044 B1 * | 2/2002 | McCrea, Jr. | 463/27 |
| 6,357,746 B1 | 3/2002 | Sadowski | 273/148 R |
| 6,361,044 B1 | 3/2002 | Block et al. | 273/149 R |
| 6,402,142 B1 | 6/2002 | Warren et al. | 273/149 R |
| 6,403,908 B2 | 6/2002 | Stardust et al. | 209/587 |
| 6,409,595 B1 | 6/2002 | Uihlein et al. | 463/29 |
| 6,425,817 B1 | 7/2002 | Momemy | 453/17 |
| 6,437,692 B1 | 8/2002 | Petite et al. | 340/540 |
| 6,446,864 B1 | 9/2002 | Kim et al. | 235/382 |
| 6,457,715 B1 | 10/2002 | Friedman | 273/274 |
| 6,460,848 B1 | 10/2002 | Soltys et al. | 273/149 R |
| 6,464,584 B2 | 10/2002 | Oliver | 463/25 |
| 6,486,655 B1 | 11/2002 | Crossfield | 324/207.17 |
| 6,497,408 B1 | 12/2002 | Walker et al. | 273/138.1 |
| 6,502,116 B1 | 12/2002 | Kelly et al. | 708/250 |
| 6,508,709 B1 | 1/2003 | Karmarkar | 463/42 |
| 6,514,140 B1 | 2/2003 | Storch | 463/25 |
| 6,517,435 B2 | 2/2003 | Soltys et al. | 463/25 |
| 6,517,436 B2 | 2/2003 | Soltys et al. | 463/29 |
| 6,520,857 B2 | 2/2003 | Soltys et al. | 463/29 |
| 6,527,271 B2 | 3/2003 | Soltys et al. | 273/148 R |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,533,664 B1 | 3/2003 | Crumby | 463/42 |
| 6,561,897 B1 | 5/2003 | Bourbour et al. | 463/13 |
| 6,568,678 B2 | 5/2003 | Breeding et al. | 273/149 R |
| 6,579,180 B2 | 6/2003 | Soltys et al. | 463/25 |

| | | | | | |
|---|---|---|---|---|---|
| 6,579,181 B2 | 6/2003 | Soltys et al. ............... 463/25 | 2005/0051965 A1 | 3/2005 | Gururajan ................ 273/292 |
| 6,581,747 B1 | 6/2003 | Charlier et al. ............ 194/214 | 2005/0054408 A1 | 3/2005 | Steil et al. ................... 463/11 |
| 6,582,301 B2 | 6/2003 | Hill .............................. 463/11 | 2005/0062226 A1 | 3/2005 | Schubert et al. ........ 273/149 R |
| 6,588,750 B1 | 7/2003 | Grauzer et al. .......... 273/149 R | 2005/0062227 A1 | 3/2005 | Grauzer et al. .......... 273/149 R |
| 6,588,751 B1 | 7/2003 | Grauzer et al. .......... 273/149 R | 2005/0073102 A1 | 4/2005 | Yoseloff et al. ............ 273/292 |
| 6,595,857 B2 | 7/2003 | Soltys et al. ................ 463/29 | 2005/0101367 A1 | 5/2005 | Soltys et al. ................ 463/12 |
| 6,629,591 B1 | 10/2003 | Griswold et al. ........... 194/205 | 2005/0116020 A1 | 6/2005 | Smolucha et al. .......... 235/375 |
| 6,629,889 B2 | 10/2003 | Mothwurf ................... 463/25 | 2005/0121852 A1 | 6/2005 | Soltys et al. ............. 273/149 P |
| 6,638,161 B2 | 10/2003 | Soltys et al. ................ 463/12 | 2005/0137005 A1 | 6/2005 | Soltys et al. ................ 463/13 |
| 6,651,981 B2 | 11/2003 | Grauzer et al. .......... 273/149 R | 2005/0156318 A1 | 7/2005 | Douglas .................... 257/761 |
| 6,651,982 B2 | 11/2003 | Grauzer et al. .......... 273/149 R | 2005/0164761 A1 | 7/2005 | Tain ........................... 463/13 |
| 6,652,379 B2 | 11/2003 | Soltys et al. ................ 463/22 | 2005/0183264 A1 | 8/2005 | Eckstein et al. ............. 29/834 |
| 6,655,684 B2 | 12/2003 | Grauzer et al. .......... 273/149 R | 2005/0200483 A1 | 9/2005 | Eckstein et al. .......... 340/572.2 |
| 6,659,875 B2 | 12/2003 | Purton ........................ 463/47 | 2005/0227760 A1 | 10/2005 | Vlazny et al. ................ 463/28 |
| 6,663,490 B2 | 12/2003 | Soltys et al. ................ 463/25 | 2005/0266919 A1 | 12/2005 | Rowe et al. .................. 463/25 |
| 6,676,127 B2 | 1/2004 | Johnson et al. .......... 273/149 R | 2005/0288083 A1 | 12/2005 | Downs, III ................... 463/11 |
| 6,685,564 B2 | 2/2004 | Oliver ......................... 463/25 | 2005/0288084 A1 | 12/2005 | Schubert ..................... 463/11 |
| 6,685,568 B2 | 2/2004 | Soltys et al. ................ 463/47 | 2005/0288085 A1 | 12/2005 | Schubert et al. ............. 463/11 |
| 6,688,979 B2 | 2/2004 | Soltys et al. ................ 463/25 | 2006/0001217 A1 | 1/2006 | Soltys et al. ............... 273/292 |
| 6,712,696 B2 | 3/2004 | Soltys et al. ................ 463/25 | 2006/0019745 A1 | 1/2006 | Benbrahim .................. 463/29 |
| 6,726,205 B1 | 4/2004 | Purton .................... 273/148 R | | | |
| 6,728,740 B2 | 4/2004 | Kelly et al. ................ 708/250 | | | |
| 6,729,956 B2 | 5/2004 | Wolf et al. .................. 463/25 | | | |
| 6,729,961 B1 | 5/2004 | Millerschone ............... 463/30 | | | |
| 6,735,183 B2 | 5/2004 | O'Toole et al. ............ 370/311 | | | |
| 6,758,751 B2 | 7/2004 | Soltys et al. ................ 463/29 | | | |
| 6,812,824 B1 | 11/2004 | Goldinger et al. ......... 340/10.1 | | | |
| 6,889,979 B2 | 5/2005 | Blaha et al. ............. 273/149 R | | | |
| 6,925,701 B2 | 8/2005 | Eckstein et al. ............ 29/602.1 | | | |
| 6,947,513 B2 | 9/2005 | O'Toole et al. ............ 375/374 | | | |
| 6,955,599 B2 | 10/2005 | Bourbour et al. ........... 463/13 | | | |
| 6,970,141 B2 | 11/2005 | Copeland et al. ........... 343/866 | | | |
| 7,009,496 B2 | 3/2006 | Arneson et al. ........... 340/10.2 | | | |
| 7,011,309 B2 | 3/2006 | Soltys et al. ............ 273/149 R | | | |
| 7,028,910 B2 | 4/2006 | Reignoux et al. ........... 235/492 | | | |
| 7,029,009 B2 | 4/2006 | Grauzer et al. .......... 273/149 P | | | |
| 7,040,139 B2 | 5/2006 | Sunshine .................... 73/23.2 | | | |
| 7,073,791 B2 | 7/2006 | Grauzer et al. .......... 273/149 R | | | |
| 7,077,332 B2 * | 7/2006 | Verschuur et al. .......... 235/492 | | | |
| 7,137,627 B2 | 11/2006 | Grauzer et al. .......... 273/149 R | | | |
| 7,255,344 B2 | 8/2007 | Grauzer et al. .......... 273/149 R | | | |
| 2002/0063389 A1 | 5/2002 | Breeding et al. ........... 273/292 | | | |
| 2002/0111210 A1 | 8/2002 | Luciano, Jr. et al. ......... 463/29 | | | |
| 2002/0147042 A1 | 10/2002 | Vuong et al. ................ 463/40 | | | |
| 2002/0163125 A1 | 11/2002 | Grauzer et al. .......... 273/149 R | | | |
| 2002/0187821 A1 | 12/2002 | Soltys et al. ................ 463/11 | | | |
| 2003/0032474 A1 | 2/2003 | Kaminkow ................. 463/25 | | | |
| 2003/0036425 A1 | 2/2003 | Kaminkow et al. .......... 463/25 | | | |
| 2003/0054878 A1 | 3/2003 | Benoy et al. ................ 463/29 | | | |
| 2003/0064774 A1 * | 4/2003 | Fujimoto et al. ............ 463/16 | | | |
| 2003/0064798 A1 | 4/2003 | Grauzer et al. .............. 463/29 | | | |
| 2003/0073479 A1 | 4/2003 | Wilson et al. ............... 463/16 | | | |
| 2003/0073498 A1 | 4/2003 | Grauzer et al. .............. 463/42 | | | |
| 2003/0104856 A1 | 6/2003 | Wolf ........................... 463/16 | | | |
| 2003/0173737 A1 | 9/2003 | Soltys et al. ............ 273/149 R | | | |
| 2003/0176209 A1 | 9/2003 | Soltys et al. ................ 463/13 | | | |
| 2003/0195037 A1 | 10/2003 | Vuong et al. ................ 463/29 | | | |
| 2004/0067789 A1 | 4/2004 | Grauzer et al. .............. 463/11 | | | |
| 2004/0100026 A1 | 5/2004 | Haggard .................... 273/304 | | | |
| 2004/0108255 A1 | 6/2004 | Johnson ..................... 209/547 | | | |
| 2004/0111338 A1 | 6/2004 | Bandy et al. ................ 705/28 | | | |
| 2004/0127277 A1 | 7/2004 | Walker et al. ............... 463/16 | | | |
| 2004/0147327 A1 | 7/2004 | Soltys et al. ................ 463/47 | | | |
| 2004/0207156 A1 | 10/2004 | Soltys et al. ............... 273/292 | | | |
| 2004/0219982 A1 | 11/2004 | Khoo et al. ................. 463/42 | | | |
| 2004/0224777 A1 | 11/2004 | Smith et al. ................. 463/47 | | | |
| 2004/0229682 A1 | 11/2004 | Gelinotte .................... 463/25 | | | |
| 2005/0012270 A1 | 1/2005 | Schubert et al. ......... 273/149 R | | | |
| 2005/0026680 A1 | 2/2005 | Gururajan .................. 463/25 | | | |
| 2005/0026681 A1 | 2/2005 | Grauzer et al. .............. 463/29 | | | |
| 2005/0026682 A1 | 2/2005 | Grauzer et al. .............. 463/25 | | | |
| 2005/0027604 A1 | 2/2005 | Bandy et al. ................ 705/22 | | | |
| 2005/0051955 A1 | 3/2005 | Schubert et al. ......... 273/149 R | | | |

FOREIGN PATENT DOCUMENTS

| | | |
|---|---|---|
| DE | 197 48 930 A1 | 5/1998 |
| EP | 0 327 069 A2 | 8/1989 |
| EP | 0 790 848 | 8/1997 |
| EP | 1 291 045 A2 | 3/2003 |
| FR | 2 775 196 | 8/1999 |
| GB | 2 246 520 A | 2/1992 |
| GB | 2 370 791 A | 7/2002 |
| GB | 2 380 143 A | 4/2003 |
| WO | WO 96/03188 | 2/1996 |
| WO | WO 96/36253 | 11/1996 |
| WO | WO 99/43403 | 9/1999 |
| WO | WO 00/22585 | 4/2000 |
| WO | WO 02/05914 A1 | 1/2002 |
| WO | WO 02/051512 A2 | 7/2002 |
| WO | WO 03/004116 A1 | 1/2003 |
| WO | WO 2006/039308 A2 | 4/2006 |

OTHER PUBLICATIONS

English Translation of German Patent No. DE 197 48 930, publication date of May 14, 1998, inventor: Markeev.
U.S. Appl. No. 10/902,436, filed Jul. 29, 2004, Soltys et al.
U.S. Appl. No. 10/962,166, filed Oct. 8, 2004, Soltys et al.
U.S. Appl. No. 11/059,743, filed Feb. 16, 2005, Soltys et al.
U.S. Appl. No. 11/112,793, filed Apr. 21, 2005, Soltys et al.
U.S. Appl. No. 11/428,240, filed Jun. 30, 2006, Fleckenstein.
U.S. Appl. No. 11/428,244, filed Jun. 30, 2006, Soltys.
U.S. Appl. No. 11/428,249, filed Jun. 30, 2006, Fleckenstein.
U.S. Appl. No. 11/428,253, filed Jun. 30, 2006, Fleckenstein.
U.S. Appl. No. 11/428,258, filed Jun. 30, 2006, Fleckenstein.
U.S. Appl. No. 11/428,264, filed Jun. 30, 2006, Soltys.
U.S. Appl. No. 11/428,286, filed Jun. 30, 2006, Soltys et al.
U.S. Appl. No. 11/437,590, filed May 19, 2006, Soltys et al.
U.S. Appl. No. 11/478,360, filed Jun. 29, 2006, Fleckenstein.
U.S. Appl. No. 11/479,930, filed Jun. 30, 2006, Soltys et al.
U.S. Appl. No. 11/479,963, filed Jun. 29, 2006, Fleckenstein.
U.S. Appl. No. 11/479,988, filed Jun. 30, 2006, Shayesteh.
U.S. Appl. No. 11/479,991, filed Jun. 29, 2006, Soltys.
U.S. Appl. No. 11/480,273, filed Jun. 30, 2006, Soltys.
U.S. Appl. No. 11/480,275, filed Jun. 30, 2006, Fleckenstein.
U.S. Appl. No. 11/480,295, filed Jun. 29, 2006, Fleckenstein.
U.S. Appl. No. 11/480,321, filed Jun. 30, 2006, Soltys.
U.S. Appl. No. 11/480,345, filed Jun. 30, 2006, Fleckenstein.
U.S. Appl. No. 11/480,349, filed Jun. 30, 2006, Soltys et al.
U.S. Appl. No. 11/519,244, filed Sep. 11, 2006, Soltys et al.
U.S. Appl. No. 60/838,280, filed Aug. 17, 2006, Soltys et al.
U.S. Appl. No. 60/847,331, filed Sep. 26, 2006, Shayesteh.
Bulavsky, J., "Tracking the Tables," *Casino Journal*, May 2004, pp. 44-47, accessed Dec. 21, 2005, URL =http://www.ascendgaming.com/cj/vendors_manufacturers_table/Trackin916200411141AM.htm, 5 pages.

Gros, R., "All You Ever Wanted to Know About Table Games," reprinted from *Global Gaming Business*, Aug. 1, 2003, 2 pages.

Pro, L.V., "Book Review—The Card Counter's Guide to Casino Surveillance," *Blackjack Insider Newsletter*, May 2003, #40, accessed Aug. 25, 2006, URL =http:/bjinsider.com/newsletter_40_surveillance.shtml, 5 pages.

Scarne, J., *Scarne's Encyclopedia of Games*, Harper & Row, New York, 1973, p. 153.

Snyder, A., "The High-Tech Eye," excerpt from *Blackjack Forum*, Spring 1997, accessed Dec. 21, 2005, from Casino Software & Services, LLC, URL =http://www.casinosoftware.com/bj_forum.html.

Terdiman, D., "Who's Holding the Aces Now?", reprinted from *Wired News*, Aug. 18, 2003, 2 pages.

Ward, K., "BJ Tracking System has Players Down for the Count," *Gaming Today*, Mar. 5, 2002, accessed Dec. 21, 2005, from Casino Software & Services, LLC, URL =http://www.casinosoftware.com/gaming_today.html.

Winkler, C., "Product Spotlight: MindPlay," reprinted from *Gaming and Leisure Technology*, Fall 2003, 2 pages.

Bally TMS, "MPBacc—Intelligent Table Tracking/Features," 2 pages, Nov. 2005.

Bally TMS, "MPBacc—Specifications/Specifications," 2 pages, Nov. 2005.

Bravo Gaming Systems, "Casino Table Wager Analysis and Player Tracking System—Table Operations/Unique Features," accessed Apr. 11, 2005, URL =http://www.genesisgaming.com, 4 pages.

Casino Software & Services, LLC., accessed Aug. 25, 2006, URL =http:/casinosoftware.com/home.html, 6 pages.

*Gambling Magazine*, "Gaming Company Takes RFID to the Casino," Dec. 27, 2004, accessed Aug. 25, 2006, URL =http:/www.gamblingmagazine.com/managearticle.asp?C=290&A=13186, 4 pages.

International Guild of Hospitality & Restaurant Managers, "Shuffle Master, Inc. (NasdaqNM:SHFL)," accessed Dec. 30, 2003, URL =http://hospitalityguide.com/Financial/Casinos/Shuffle.htm, 3 pages.

Mikohn, "Mikohn Tablelink—The Industry's Premier Table Tracking Solution Delivers Improvements Straight to the Bottom Line," 2 pages, before Jan. 1, 2004.

Mikohn, "Tablelink™, The New Standard in Table Games," before Jan. 1, 2004, 14 pages.

Plaintiff's Declaration of Lawrence Luciano in Opposition to Shuffle Master's Motion for Preliminary Injunction, *Card, LLC v. Shuffle Master, Inc.*, D. Nev. (No. CV-N-03-0244-ECR-(RAM)), Nov. 24, 2003.

Shuffle Master, Inc., "Shuffle Master Announces New Products; Intelligent Table System to Be Debuted at G2E," Sep. 10, 2003, 2 pages.

Bulavsky, J., "Tracking the Tables," *Casino Journal*, pp. 44-47, May 2004.

Scarne, J., *Scarne's New Complete Guide to Gambling*, Simon & Schuster, Inc., New York, 1974, p. 358-359.

\* cited by examiner

WIRELESS MONITORING OF PLAYING CARDS AND/OR WAGERS IN GAMING

BACKGROUND OF THE INVENTION

1. Field of the Invention

The present description generally relates to gaming, and in particular to games played with playing cards.

2. Description of the Related Art

Casinos and other forms of gaming are a multi-billion dollar worldwide industry. Typically, a player exchanges currency or a form of credit for a casino's chips. The player places the chips as wagers at various games, such as blackjack, baccarat, poker, and other well-known card games. A game operator, such as a dealer, distributes or deals the playing cards, pays out winning wagers with additional chips based on the set of odds for the particular game, and/or collects losing wagers. The odds of each game slightly favor the casino, so on average the casino wins and is profitable.

Thousands of card hands may be dealt per hour. Like many businesses, casinos wish to monitor these transactions as closely as possible. Monitoring may help the casino identify cheating by players and/or dealers. Monitoring may also allow the automation of various functions such as accounting to improve business efficiency, servicing of the tables including the delivery of extra chips when needed, and/or may providing incentives (i.e., "comps") to players based on their activity at the gaming table. Many casinos employ individuals commonly referred to as "pit bosses" to visually monitor the gaming activity including the dealing of cards, placing of wagers, payout of winning wagers and collection of losing wagers. A number of automated devices have been proposed for assisting casinos in monitoring the gaming activity. For example, card readers which optically or magnetically scan either standard or special markings on the playing cards to identify the playing cards as they are dealt. Optical scanners have also been proposed for reading markings carried by wagering chips, such as barcodes. Further, radio frequency identification ("RFID") transceivers have been proposed for reading RFID tags incorporated in wagering chips.

The use of optical markings have a number of distinct drawbacks. For example, these markings degrade during use for example due to excessive handling and/or spills or stains, and thus become difficult or impossible to read. Optical markings are also difficult to read in the uncontrolled visual environment common in casinos. For example, optical systems rely on line-of-sight, which may be blocked in the uncontrolled visual environment of a gaming table, for example, by a drink or other object placed on the gaming table. Further, players and other casino customers wear a large variety of colors in their clothing, which clutters the visual background, making the optical marking difficult or impossible to read.

Magnetic marking also have a number of distinct drawbacks. For example, RFID technology has other distinct drawbacks. For example, these markings degrade during use for example due to excessive handling, and thus become difficult or impossible to read. Magnetic markings must be placed in very close proximity to the reader, which typically requires the swiping of the magnetic marking through a slot in the reader. This would unduly interfere with the playing of traditional card games.

RFID technology relies on a semiconductor chip coupled to an antenna. The cost of these RFID chips is rather high, currently on the order of $1.50-$2.50 per chip. Thus each set of 52 playing cards would cost between $78 and-$130, prohibitively expensive for practical use given the extremely large number of playing card sets each casino uses. While these RFID chips tend to be very thin, they are still rather large when compared with the thickness of a playing card. Thus it is difficult to incorporate an RFID chip in a playing card. For example, an RFID chip laminated in a playing card may be detectable as a lump or bump by players, causing the players to reject the playing cards and take their business to other casinos. The RFID chip may throw off the balance of the playing card, again causing players to chose other casinos. The increase in thickness in the playing card may interfere with existing casino systems, such as automatic shuffle devices.

It would be desirable to have a system and method that efficiently allows a casino to identify and/or monitor playing cards. Further, it would be desirable to have a common system and method that efficiently allows casinos to read both playing cards and wagers.

BRIEF SUMMARY OF THE INVENTION

In one aspect, a playing card comprises: a face substrate having a face surface and an inner surface opposed to the face surface, the face surface of the face substrate bearing human-readable rank and suit markings; and a conductive material carried by the playing card, the conductive material defining a response profile to an electromagnetic interrogation that uniquely corresponds to at least the rank marking on the face surface of the face substrate.

In another aspect, a playing card comprises: a face substrate having a face surface and an inner surface opposed to the face surface, the face surface of the face substrate bearing human-readable rank and suit markings; a base substrate having a first surface and a second surface opposed to the first surface; and a conductive material disposed on at least one of the inner surface of the face substrate and the first surface of the base substrate to form at least a portion of a resident circuit, wherein the face substrate and the base substrate form a laminate structure having the inner surface of the face substrate facing the first surface of the base substrate to protectively envelope at least a portion of the conductive material.

In another aspect, a playing card, comprises: a face substrate having a face surface and an inner surface opposed to the face surface, the face surface of the face substrate bearing human-readable rank and suit markings; a base substrate having a first surface and a second surface opposed to the first surface; and a conductive material disposed on at least one of the surfaces of the base substrate to form at least a portion of a resident circuit, wherein the face substrate and the base substrate form a laminate structure having an inner surface of the face substrate facing the first surface of the base substrate to protectively envelope at least a portion of the conductive material. In yet another aspect, a playing card comprises: a face substrate having a face surface; a set of human-readable rank and suit markings printed on the face surface of the face substrate; and a plurality of conductive elements distributed within the human-readable rank and suit markings, the distribution of the conductive elements uniquely identifiable to at least a value of the rank marking.

In yet another aspect, a set of playing cards comprises: a plurality of playing cards, each playing card comprising: a face substrate having a face surface and an inner surface opposed to the face surface, the face surface of the face substrate bearing human-readable rank and suit markings; and a conductive material carried by the playing card and defining a response profile to electromagnetic interrogation that uniquely corresponds to at least the rank marking on the face surface of the face substrate of the respective playing card.

In even a further aspect, a playing card reader comprises: a housing having a receptacle sized to receive a plurality of playing cards; a transmitter received in the housing; a receiver received in the housing; and at least a first antenna electrically coupled to at least one of the transmitter and the receiver, the first antenna positioned to electromagnetically interrogate at least some of the playing cards.

In yet a further aspect, a system for wirelessly monitoring wagering and play of a playing card game at a gaming table using playing cards and wagering chips each bearing conductive material, comprises: a card reader having a wireless transmitter and receiver coupled to at least a first antenna to electromagnetically interrogate playing cards; a chip reader having at least one wireless transmitter and receiver coupled to a plurality of antennas positioned proximate to respective wagering placement areas to electromagnetically interrogate wagering chips placed at the wagering placement areas, if any; and a computing system coupled to receive data from both the wireless card reader and the wireless chip reader.

In an even further aspect, a method of automating a card game, comprises: wirelessly interrogating each of a plurality of playing cards using radio frequency transmissions; and for at least some of the playing cards, determining a rank of the playing card based on the wireless interrogation.

In yet a further aspect, a set of playing cards comprises: a first plurality of playing cards each having a value of 10, each playing card in the first plurality of playing cards comprising: a face substrate having a face surface and an inner surface opposed to the face surface, the face surface of the face substrate bearing human-readable rank and suit markings; and a conductive material carried by the playing card responsive to radio frequency interrogation; and a second plurality of playing cards each having a rank of ace, each playing card in the second plurality of playing cards comprising: a face substrate having a face surface and an inner surface opposed to the face surface, the face surface of the face substrate bearing human-readable rank and suit markings; and a conductive material carried by the playing card responsive to radio frequency interrogation, wherein the conductive material is positioned at a first location on each of the playing cards in the first plurality of playing cards and at a second location, different than the first location, on each of the playing cards of the second plurality of playing cards.

In yet a further aspect, a playing card reader comprises: means for radio frequency interrogating a playing card; and means for determining a position of a conductive material on the playing card in response to the radio frequency interrogation. In yet a further aspect, a method of identifying playing cards comprises: for each playing card, transmitting at least a first radio frequency interrogation signal; and receiving a radio frequency response from the playing cards; and determining a value of the playing card based on the received radio frequency response.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements and angles are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of the various embodiments of the invention. However, one skilled in the art will understand that the invention may be practiced without these details. In other instances, well-known structures associated with transmitters, receivers, transceivers, antennas, and computing systems, have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Figure 1:
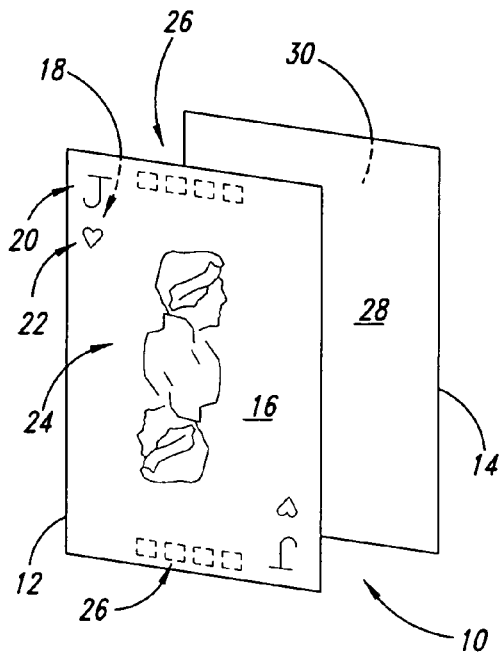
FIG. 1 is an isometric exploded view of a playing card according to a first embodiment, where conductive material is deposited on an inner surface of a face substrate and covered with a back substrate.

FIG. 1 shows a playing card 10 formed from a face substrate 12 and a back substrate 14. The face substrate 12 includes an outer surface 16 and an opposed inner surface 18. The outer surface carries various indicia such as a rank marking 20 (e.g., two-ten, jack, queen, king, ace), suit markings 22 (e.g., heart, diamond, club, spade), pips (not shown), and/or illustrations 24. The inner surface 18 of the face substrate 12 carries conductive material 26. The back substrate 14 includes an inner surface 28 and an outer surface 30. The back substrate 14 overlies the conductive material 26 to provide electrical insulation and/or physical protection to the conductive material 26. The back substrate 14 may be joined to the face substrate 12 through any suitable means, for example, lamination. Where the back substrate 14 forms an outer layer of the playing card 10, the outer surface 30 typically carries a decorative pattern that is identical from playing card to playing card.

The number, placement and/or size of the conductive material may be selected based on the rank and/or suit of the playing card 10, to uniquely encode identifying information for the particular rank and/or suit. Additionally, or alternatively, these same parameters can be selected to encode identifying information such as a serial number (numeric, alpha, alpha-numeric or otherwise), to unique identify the playing card 10 with respect to any other playing card used in the casino (e.g., unique with respect to hundreds or thousands of decks of playing cards).

Figure 2:
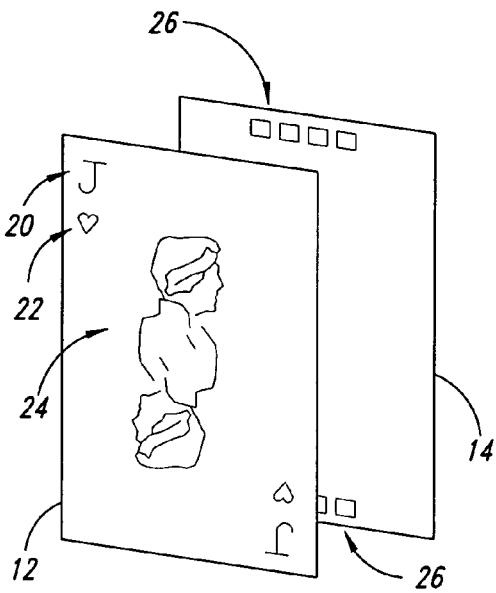
FIG. 2 is an isometric exploded view of a playing card according to a second embodiment, where conductive material is deposited on an inner surface of the back substrate and covered by the face substrate.

FIG. 2 shows an alternative embodiment of the playing card 10. This alternative embodiment, and those alternative embodiments and other alternatives described herein, are substantially similar to previously described embodiments, and common acts and structures are identified by the same reference numbers. Only significant differences in the operation and structure are described below.

In contrast to the embodiment of FIG. 1, in the embodiment of FIG. 2 the back substrate 14 carries the conductive material 26. The face substrate 12 overlies the conductive material 26 to provide electrical insulation and/or physical environmental protection.

Figure 3:
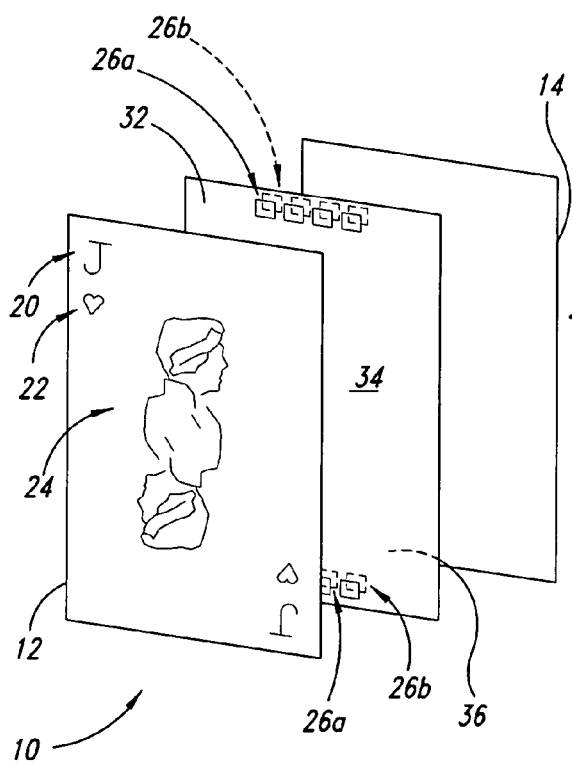
FIG. 3 is an isometric exploded view of a playing card according to a third embodiment, where conductive material is deposited on two surfaces of an intermediary base substrate and covered by the face substrate and back substrate.

FIG. 3 shows a playing card 10 formed of the face substrate 12, back substrate 14, and intermediate base substrate 32. The base substrate 32 includes first and second opposed surfaces 34, 36 each of which bear conductive material 26. The base substrate 32 may consist of an electrically insulative or dielectric material. The conductive material 26a on the first face 34 may be in registration with the conductive material 26b on the second face 36 to produce a capacitive effect. Identifying information may be encoded into the playing card 10 by varying the number, placement, and/or size of the capacitors formed by the conductive material 26a, 26b.

Figure 4:
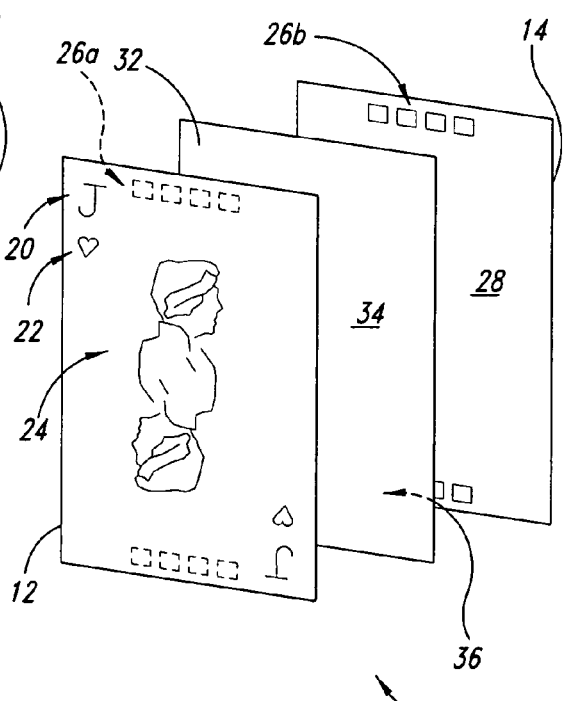
FIG. 4 is an isometric exploded view of a playing card according to a fourth embodiment, where conductive material is deposited on an inner surface of both the face substrate and the back substrate, and an insulating or dielectric intermediate base substrate is positioned therebetween.

FIG. 4 shows a playing card 10 comprising the face substrate 12, back substrate 14, and intermediary base substrate 32. In the embodiment of FIG. 4, the inner surface 18 of the face substrate 12 bears the conductive material 26a, while the inner surface 28 of the back substrate 14 bears the conductive material 26b. As in the embodiment of FIG. 3, the intermediary substrate 32 may be formed of an electrically insulative material or dielectric material. Further, the conductive material 26a may be in registration with the conductive material 26b to produce a capacitive effect to encode identifying information.

Figure 5:
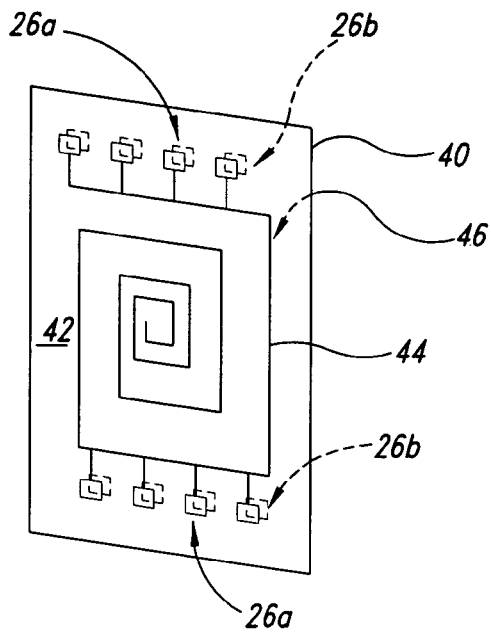
FIG. 5 is an isometric view of conductive material deposited on a substrate electrically coupled to an antenna.

FIG. 5 shows a substrate 40 having a first surface 42 carrying conductive material 26a and an antenna 44. The antenna 44 may take the form of a conductive trace deposited or otherwise applied to the surface 42 and electrically coupled to the conductive material 26a to form a resonance circuit resonant at a particular resonance frequency. Optionally, a second surface 46 may carry conductive material 26b, positioned with respect to the conductive material 26a and spaced therefrom to produce a capacitive effect, to form a resonance circuit resonant at particular resonance frequency.

Figure 6:
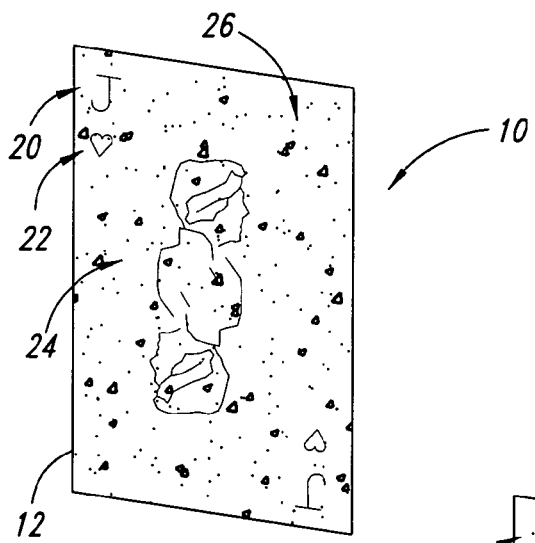
FIG. 6 is an isometric view of a playing card according to another embodiment, where conductive material is distributed in the substrate of the playing card.

FIG. 6 shows a playing card 10 having conductive material 26 distributed throughout the face substrate 12. The playing card of FIG. 10 may or may not include a back substrate 14 and/or intermediate base substrate. The distribution of conductive material 26 may be unique to the rank and/or suit of the playing card 10 for uniquely identifying the playing card 10 from other playing cards in the set. Additionally, or alternatively, the distribution of conductive material 26 may uniquely identifying the playing card 10 from all other playing cards used on the casino (e.g., unique with respect to hundreds or thousands of decks of playing cards). The conductive material 26 may be distributed in a controlled manner. Alternatively, the approach may take advantage of deliberate or un-deliberate statistical deviations in the manufacturing process to produce a random distribution of the conductive material 26. The random distribution of conductive material 26 can later be matched or mapped to a rank and/or suit of the playing card 10 to uniquely identify the rank and/or suit of the playing card in a set of playing cards. Additionally or alternatively, the random distribution of conductive material 26 can later be matched or mapped to uniquely identify the playing card 10 from all playing cards used in the casino (e.g., unique with respect to hundreds or thousands of decks of playing cards). The mapping may be supplied in computer-readable form, along with the playing cards.

Figure 7:
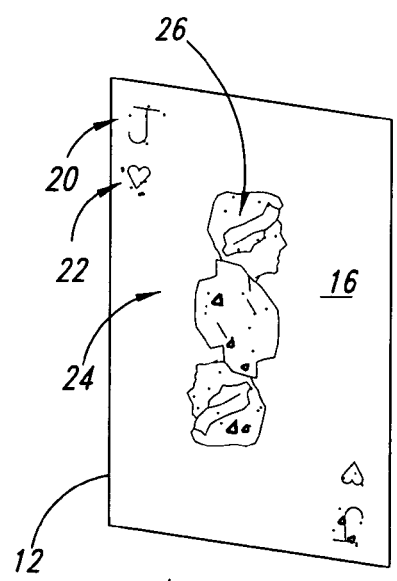
FIG. 7 is an isometric view of a playing card according to a further embodiment, where conductive material is distributed in ink used to form indicia on the face or back of the playing card.

FIG. 7 shows a playing card 10 in which the conductive material 26 is distributed in the printed indicia such as the rank 20, suit 22 or illustration 24. The conductive material 26 may be mixed into an ink which is then applied to the face 16 of the face substrate 12. Alternatively, the conductive material 26 may be distributed in ink that is then applied to a back surface of the substrate 12, for example in back designs common on typical playing cards. Alternatively, the conductive material 26 may be deposited into the ink after the ink is applied to the playing card 10. As in the embodiment of FIG. 6, the distribution may be controlled or uncontrolled, deliberate or un-deliberate to uniquely identify the rank, and/or suit, and/or playing card 10.

Figure 8:
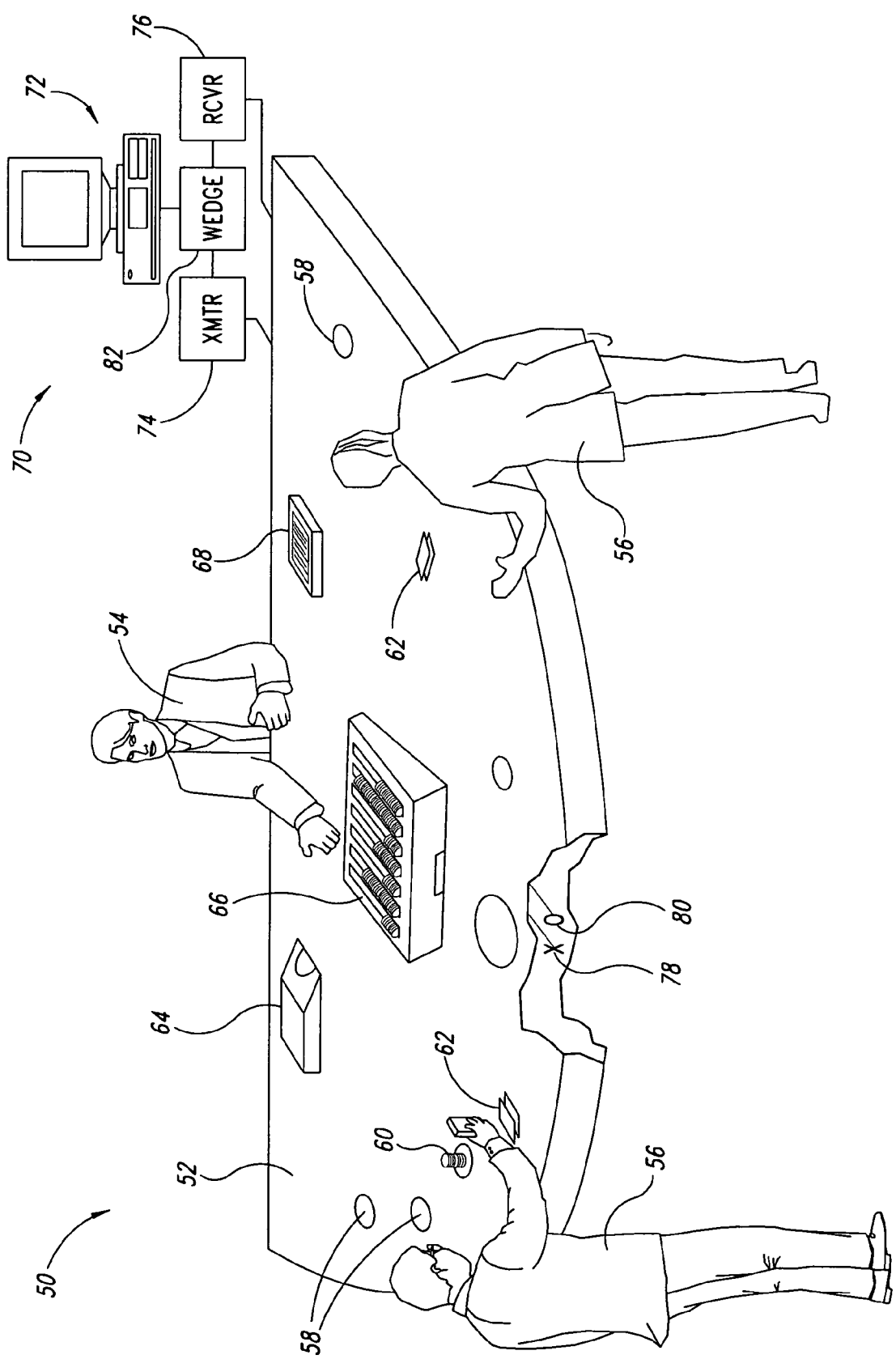
FIG. 8 shows a gaming environment including a gaming table, card shoe, chip tray and discard shoe and automated monitoring system, allowing monitoring of a card game dealt by a dealer to players, and collection and payment wagers.

FIG. 8 shows a gaming environment 50 including a gaming table 52 operated by a dealer 54 and at which players 56 play. The game table 52 may include a number of areas known as bet circles 58 for placing wagers represented by chips 60. The dealer 54 may deal playing cards 62 from a card shoe 64 which holds one or more decks of cards, typically up to eight decks. The dealer 54 may pay winning wagers using chips taken from a chip tray 66 and/or collect losing wagers by retrieving the wagered chips 60 and placing the retrieved chips in the chip tray 66. The dealer 54 may optionally return playing cards 62 collected at the end of each round or game to an optional discard shoe 68. Casinos typically define an order in which playing cards 62 are collected. This allows the individual hands to be recreated if a player later challenges the outcome, even after the playing cards 62 are collected.

An automated wireless system 70 may wirelessly monitor playing cards and/or chips. The system 70 includes a computing system 72 controllingly coupled to a transmitter 74 and receiver 76. In some embodiments, the transmitter 74 and receiver 76 may be formed as a single transceiver. The transmitter is coupled to one or more antennas 78, and the receiver is coupled to one or more antennas 80. For example, the transmitter 74 may be coupled to an antenna 78 positioned in or on the gaming table 52. The receiver 76 may be coupled to an antenna 80 positioned in, or on, the gaming table 52. The antennas 78, 80 may be positioned at a central location, or respective antennas 78, 80 may be positioned proximate each of the bet circles 58, respectively. Antennas 78, 80 may also be positioned in the card shoe 64, chip tray 66, and/or discard shoe 68. The system 70 may include a wedge or similar device between the computing system 72 and the transmitter 74 and/or receiver 76 for converting RF signals into data suitable for processing by the computing system 72 (e.g., converting RF signals into formatted ASCII data).

Figure 9:
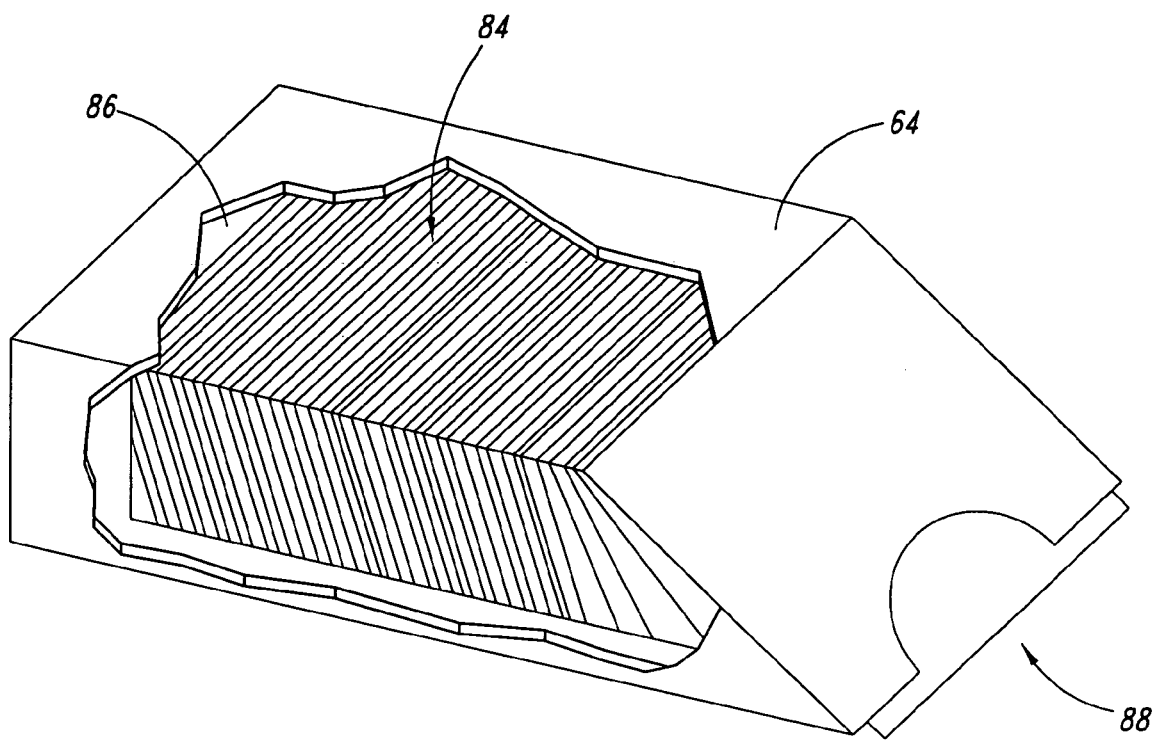
FIG. 9 is an isometric broken view of a card shoe holding a plurality of playing cards.
Figure 10:
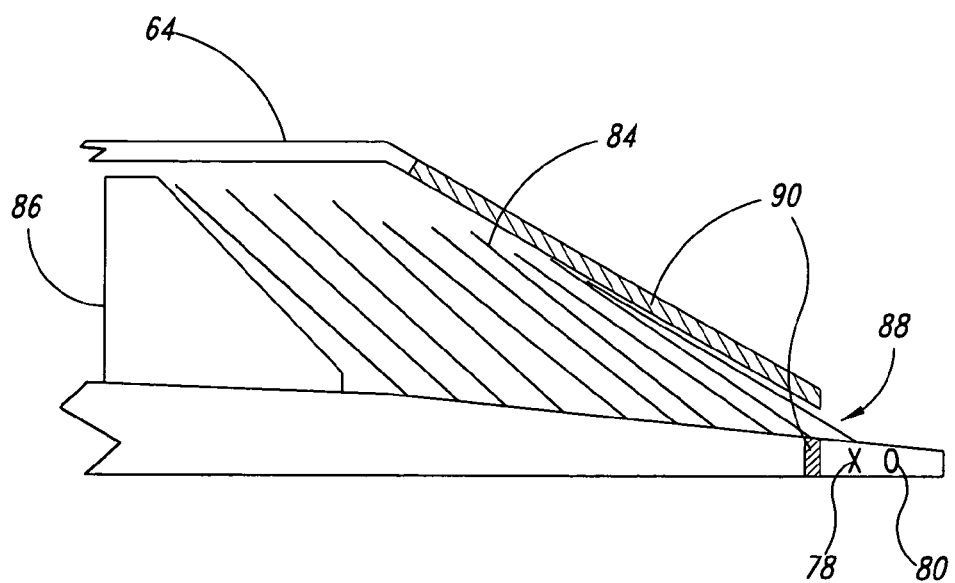
FIG. 10 is a partial cross-sectional view of a portion of the playing card shoe of FIG. 9.

FIGS. 9 and 10 show the card shoe 64 including a plurality of playing cards 84 and a block or weight 86 for urging the playing cards 84 towards a slot 88. A portion 90 of the card shoe 64 may be formed of a radio frequency impervious, resistant or absorbent material, thereby forming an RF barrier isolating all but one playing card from the antennas 78, 80 at a time. Thus, each playing card will be wirelessly interrogated as it is removed from the card shoe 64 by way of the slot 88, without interference by the other playing cards 84 in the card shoe 64.

Figure 11:
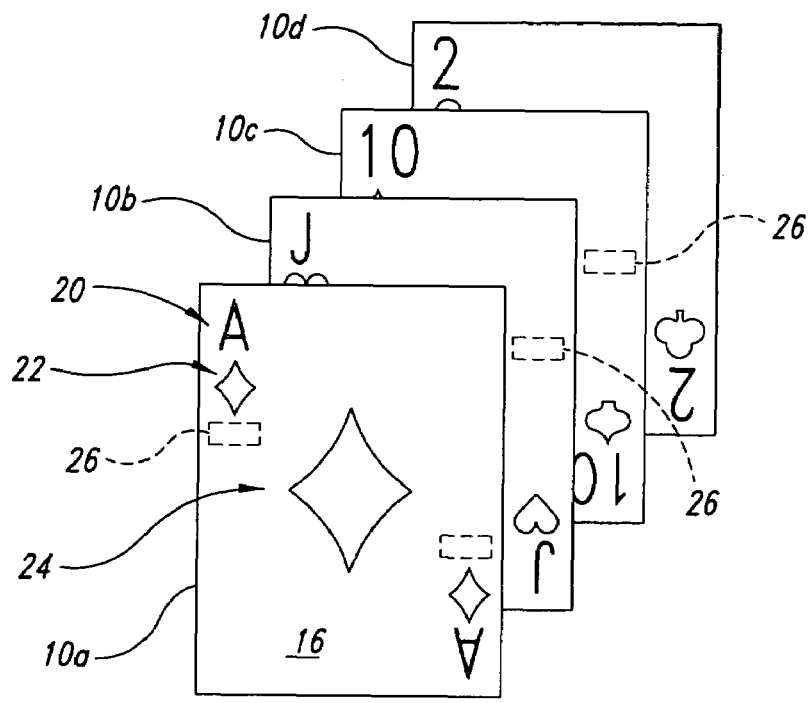
FIG. 11 is a plan view of a number of playing cards according to a further embodiment where a position of a conductive material on the playing card corresponds to an identity of the playing card.

FIG. 11 shows a number of playing cards 10 according to an alternative embodiment where the position of the conductive material 26 corresponds to the rank 20 and/or suit 22 of the playing card 10. For example, playing cards with the value of eleven or one (e.g., ACE) may carry the conductive material 26 in the upper left and lower right quadrants of the face 16 as illustrated in FIG. 11. Playing cards 10*b*, 10*c* having a value of 10 (e.g., ten, Jack, Queen, King) may carry the conductive material 26 in the upper right and lower left quadrants of the face 16 of the playing card. Playing cards having other values 10*d* (two-nine) may not carry conductive material 26 or may carry conductive material 26 in other positions on the face 16.

Figure 12:
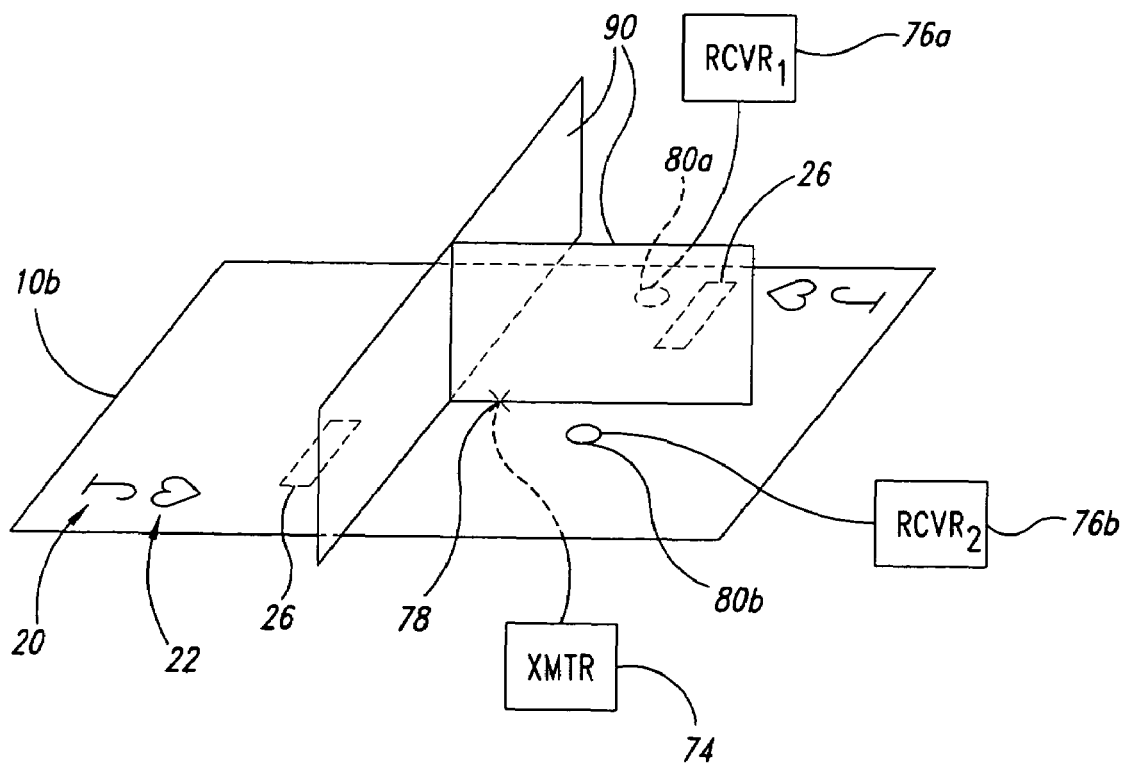
FIG. 12 is an isometric view of one of the playing cards of FIG. 11 positioned relative to transmitting and receiving antennas and an radio frequency barrier.

FIG. 12 shows one of the playing cards 10*b* of FIG. 11, positioned in a playing card reader such as the card shoe 64 or discard shoe 58. In this embodiment, the radio frequency barrier 90 isolates two quadrants of the playing card. The antenna 78 coupled to the transmitter 74 is positioned below the card 10*b* and barrier 90 to radiate both quadrants of the playing card 10*b* isolated by the barrier 90. The antennas 80*a*, 80*b* are positioned in respective quadrants, isolated by the barrier 90. The antennas 80*a*, 80*b* may be electrically coupled to respective receiver 76*a*, 76*b* or alternatively to a single receiver 76. Thus, interrogation via the transmitter 74 and antenna 78 may result in resonance of the conductive material 26 which would be detected by the antenna 80*a* and receiver 76*a*, but not detected by the antenna 80*b* and receiver 76*b* due to the barrier 90. Thus, it may be determined whether the playing card 10 has a value of ten, or whether the playing card is an ACE having a value of eleven or one. This embodiment is particularly suitable for games of blackjack, but may be suitable for other card games with or without modifications which will be apparent to one skilled in the art.

Figure 13:
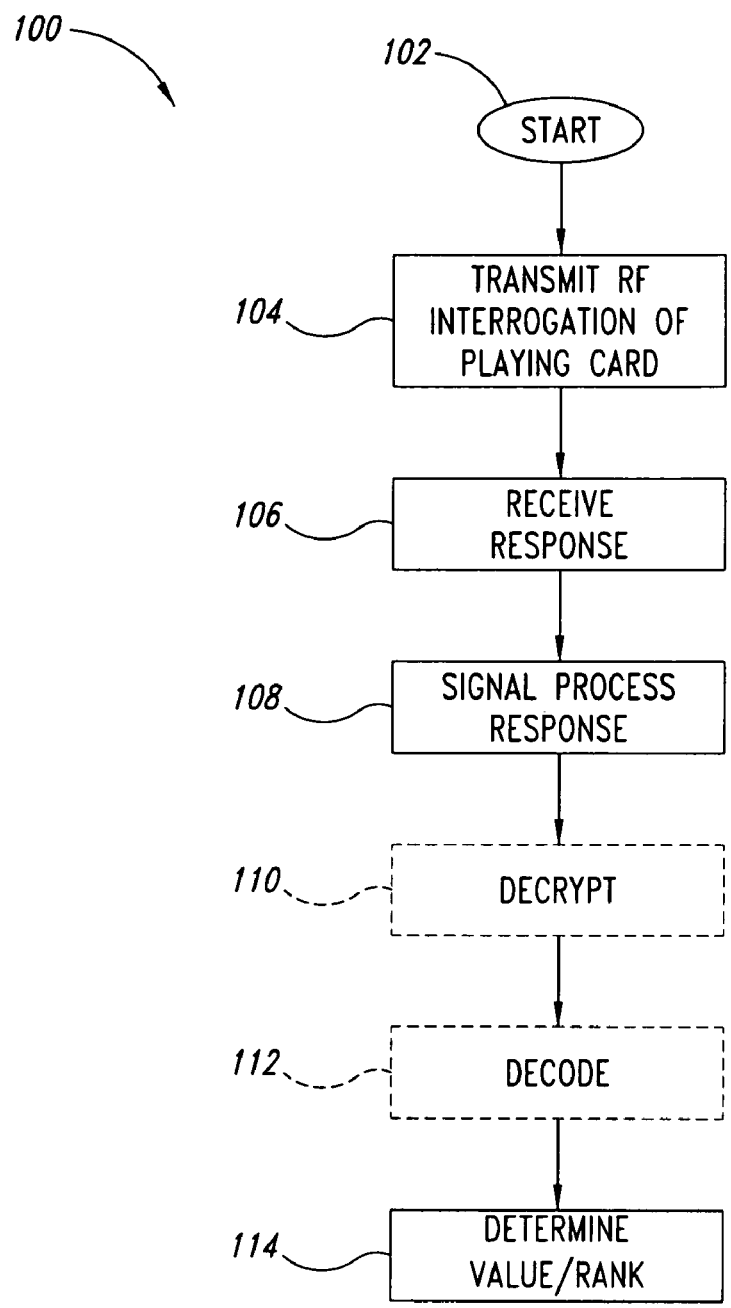
FIG. 13 is a flow diagram of a method of wirelessly identifying playing cards according to one illustrated embodiment.

FIG. 13 shows a method 100 of wirelessly reading a playing card starting in step 102. In step 104, the transmitter 74 and antenna 78 transmit a radio frequency interrogation signal. In response, the conductive material 26 resonates at a characteristic resonance frequency corresponding to at least the rank/value 20 and/or suit 22 of the playing card. In step 106, the receiver 76 and antenna 80 receive the response from the playing card 10. In step 108, the computing system 72 and/or wedge 82 signal process the response. In an optional step 110, the computing system 72 decrypts the received response. In optional step 112, the computing system 72 decodes the received signal or the decrypted signal. In step 114, the computing system 72 determines the value and/or rank of the playing card 10 based on the received response. Additionally or alternatively, the computing system 72 may determine a serial number as part of determining the value and/or rank of the playing card 10.

Figure 14:
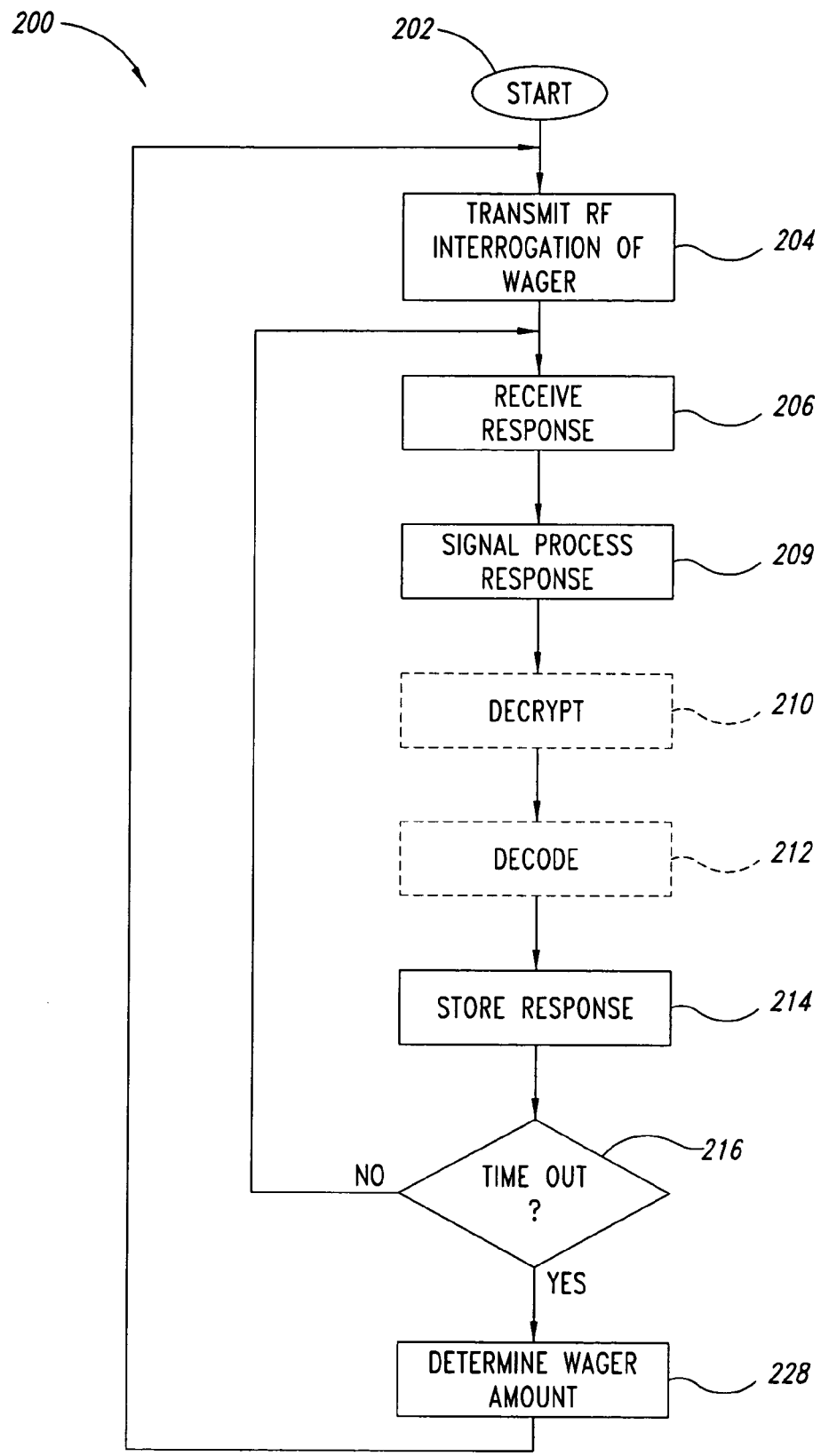
FIG. 14 is a flow diagram of a method of wirelessly identifying wagers according to one illustrated embodiment.

FIG. 14 shows a method 200 of wirelessly identifying wagers starting in step 202. In step 204, the transmitter 74 and antenna 78 transmit a radio frequency interrogation signal. In step 206, the receiver 76 and antenna 80 receive a response from one or more chips 60 representing a wager. The chips 60 may include conductive material 26 distributed or deposited in, or on, the chips 60 in a fashion similar to that of the playing cards 10 described above. Alternatively, since the chips 60 are typically much thicker than a playing card 10, the chips 60 may include an RFID semiconductor chip or wafer and antenna structure.

In step 208, the computing system 72 and/or wedge 82 processes the received response. In optional step 210, the computing system 72 decrypts the received response. In optional step 212, the computing system 72 decodes the received and/or decrypted response. In step 214 the computing system 72 stores the response. In step 216, the computing system 72 determines whether a timeout has been exceeded. If a timeout has not been exceeded, the method 200 returns control to step 206. If the timeout has been exceeded, the computing system 72 determines the wager amount in step 228. Control may then return to step 204 to identify further wagers.

The methods 100, 200 may employ polling or other techniques common in the RIFD arts for identifying individual playing cards 10 and/or chips 60 from groups of playing cards and/or chips.

Figure 15:
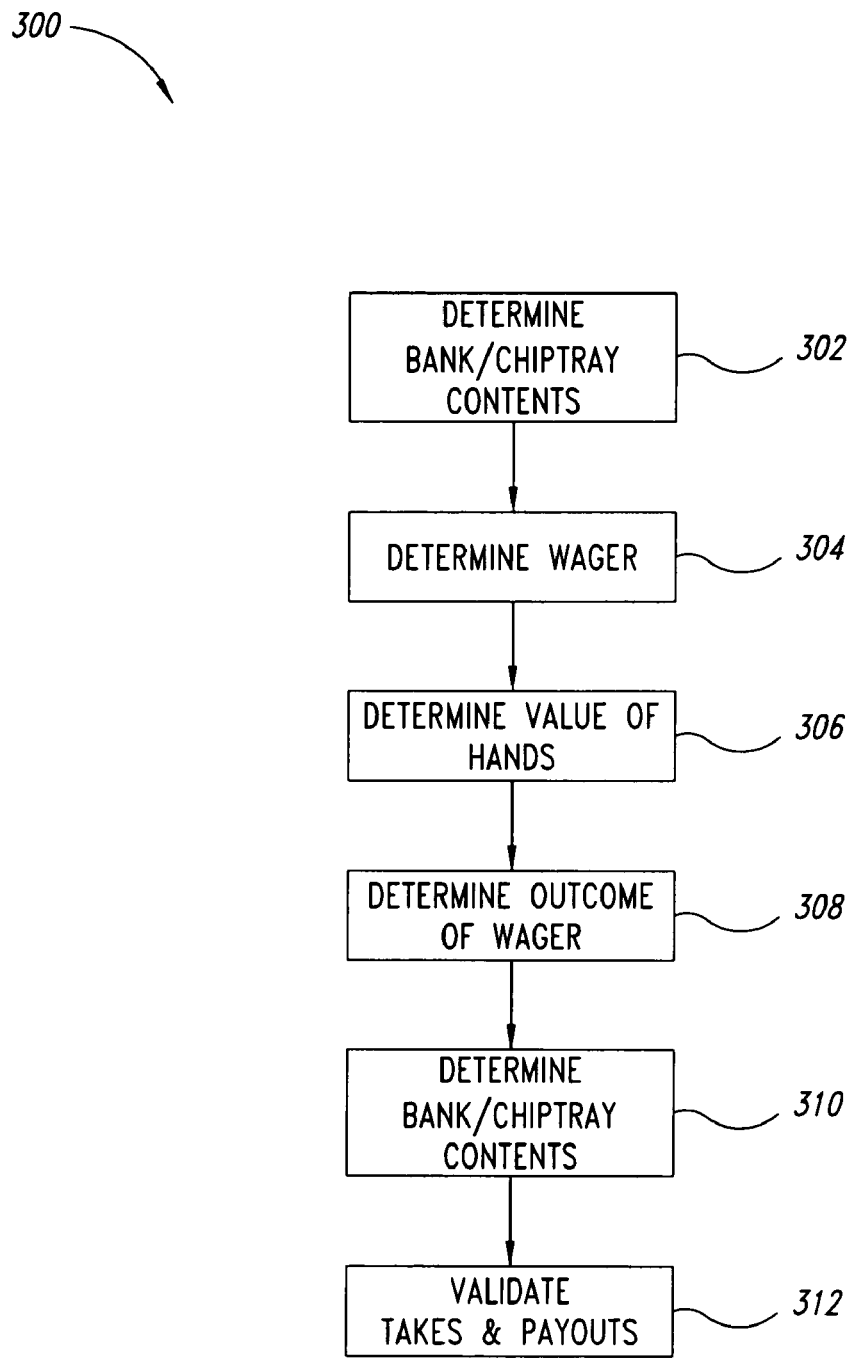
FIG. 15 is a flow diagram of a method of wirelessly monitoring a playing card game according to one illustrated embodiment.

FIG. 15 shows a method 300 of monitoring a playing card game. In step 302, a computing system 72 determines the contents of a bank or chip tray 66. The contents of the chip tray 66 may be determined in a similar fashion to that of the wagers, employing one or more transmitters 74 and antennas 78 as well as receivers 76 and antennas 80 positioned on or approximate the chip tray 66.

In step 304, the computing system 72 determines the number and size of the wagers. The computing system 72 may employ one or more transmitters 74 and antennas 78 as well as receivers 76 and antennas 80 positioned at or proximate the bet circles 58.

In step 308, the computing system 72 determines the outcome of a wager. The computing system 72 may employ one or more transmitters 74 and antennas 78 as well as receivers 76 and antennas 80 positioned in or proximate the card shoe 64, discard shoe 68 and/or player positions. Thus, the computing system 72 relies on the received responses to identify the values of the playing cards 10 and thus the value of the hands held by the players 56 and dealer 54, and compares these values to determine outcomes. The computing system 72 may further employ a defined set of odds to determine the value of the payouts.

In step 310, the computing system 72 determines the contents of the bank or chip tray 66 in a similar fashion to that described in step 302. In step 312, the computing system 72 validates the takes and payouts by comparing the contents of the chip tray 66 determined in step 310 with that determined in step 302. Discrepancies can be identified and appropriate notifications provided.

Figure 16:
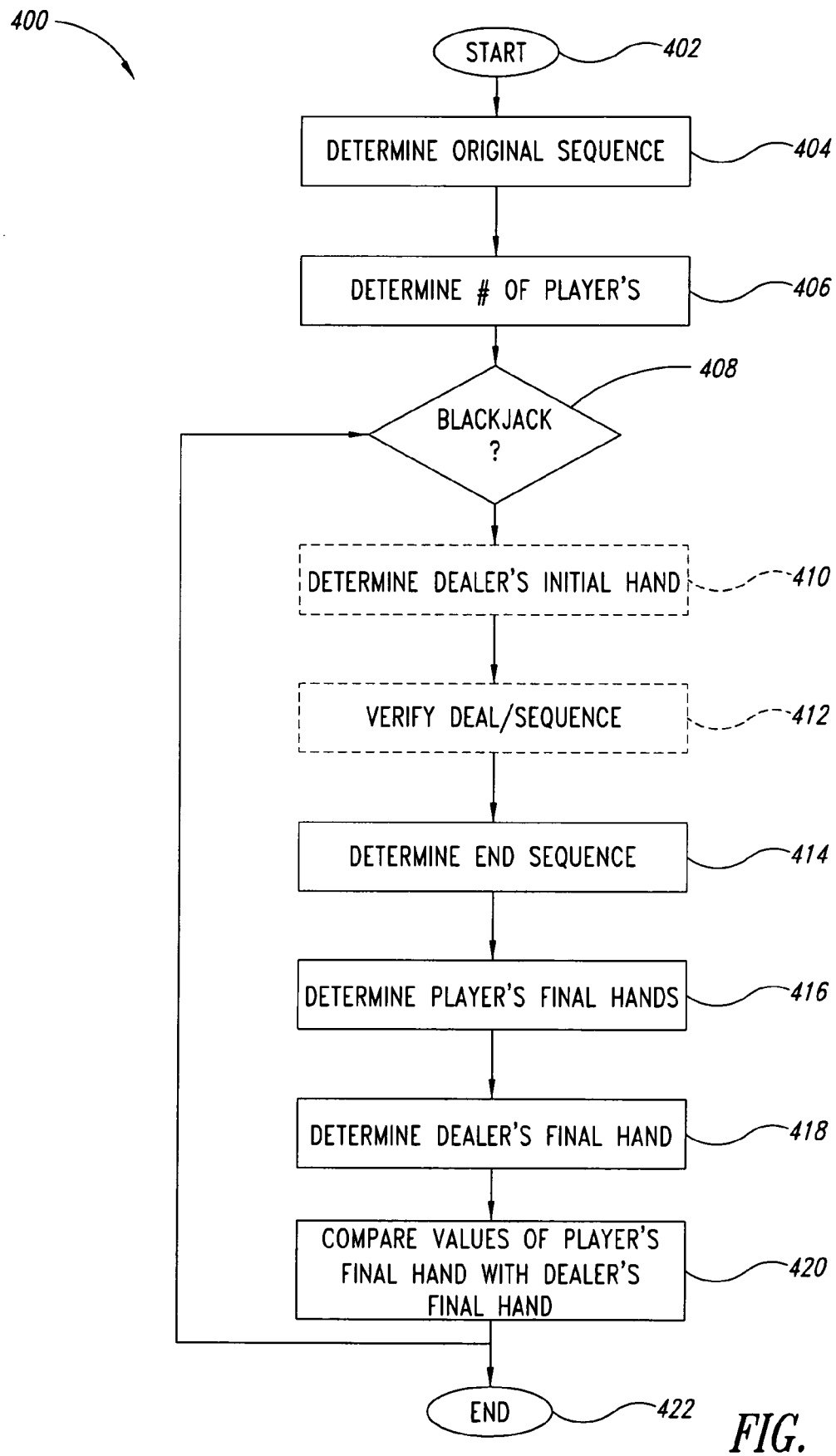
FIG. 16 is a flow diagram of an method of determining outcomes of playing card hands in an exemplary blackjack game, according to one embodiment of the invention.

FIG. 16 shows a method 400 of determining the outcome of wagers, suitable for performing some or all of step 304 of FIG. 15. The method 400 starts in step 402. In step 404, the computing system 72 determines the original sequence of the playing cards 10 in the card shoe 64. For example the computing system 72 may rely on one or more transmitters 74 and antennas 78 positioned in or proximate the card shoe 64. The computing system 72 can cause the transmitter to interrogate each of the playing cards either before the playing cards 10 are removed from the card shoe 64, or during or after the playing cards 10 are removed from the card shoe 64.

In step 406, the computing system 72 determines the number of players 56 in the game. For example, the computing 72 may employ one or more transmitters 74 and antennas 78 and one or more receivers 76 and antennas 80 to detect chips 60 at various bet circles 58. The number of bet circles 58 having chips 60 indicates the number of players 56. In optional step 408, the computing system 72 determines whether the dealer 54 has blackjack. Blackjack is defined as the dealer 54 having an initial hand of two playing cards 10 with a total value equal to twenty-one. The computing system 72 may employ one or more transmitters 74 and antennas 78, as well as one or more receivers 76 and antennas 80 positioned at or proximate the dealer 64 to interrogate the dealer's cards. In this respect the computing system 72 may alternatively employ the knowledge of the original sequence and the number of players 56 to determine the value of the dealer's hand.

In optional step 410, the computing system 72 interrogates the dealer's initial hand employing one or more transmitters 74 and antennas 78 as well as one or more receivers 76 and antennas 80 positioned proximate the dealer 54. In optional step 412, the computing system 72 verifies the deal and/or sequence of playing cards using an knowledge of the original sequence and the identify of the cards forming the dealer's initial hand learned from step 410.

In step 414, the computing system 72 may optionally determine an ending sequence for the playing cards. The computing system 72 may employ one or more transmitters 74 and antennas 78 as well as one or more receivers 76 and antennas 80 positioned in or proximate the discard holder 68.

In step 416, the computing system 72 determines the player's final hands. The computing system 72 may rely on a knowledge of the original sequence, the number of players 56 and the dealer's initial hand to determine the player's final hands. Additionally, or alternatively, the computing system 72 may rely on the knowledge of the ending sequence. In step 418, the computing system 72 determines the dealer's final hand. In step 420, the computing system 72 compares the value of the player's final hand with the value of the dealer's final hand for each of the players. The method terminates at step 422.

Figure 17:
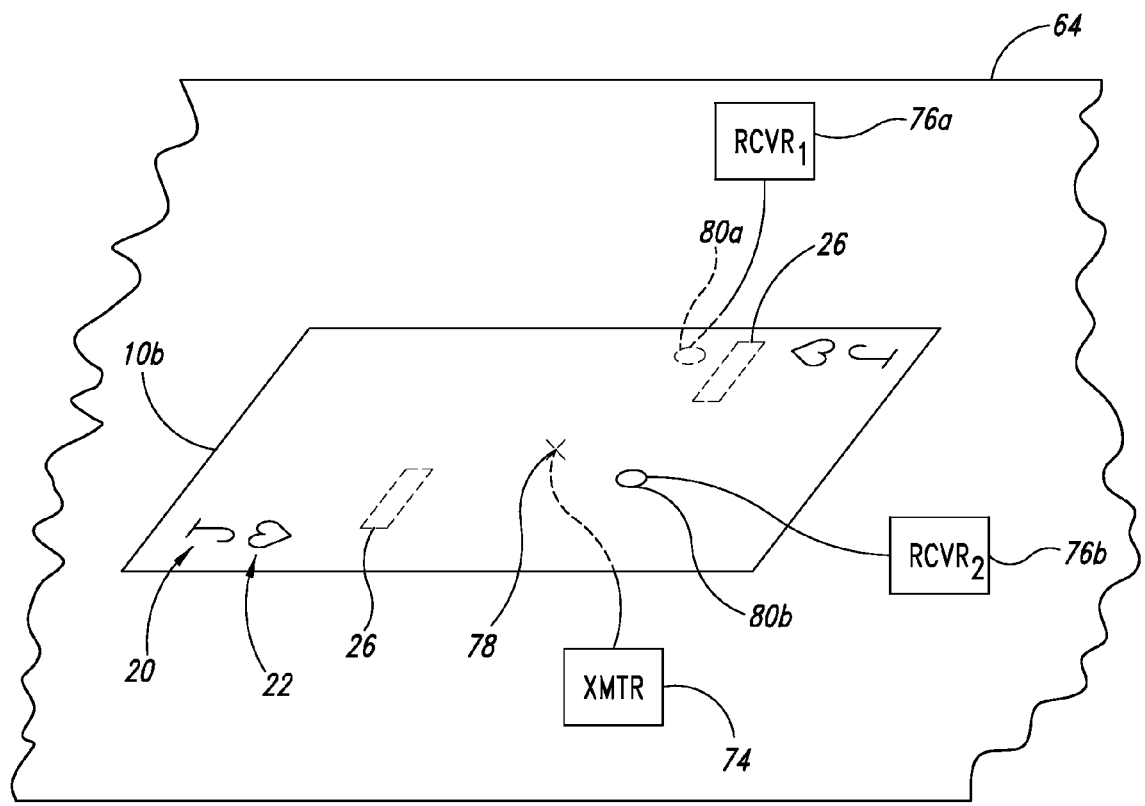
FIG. 17 is an isometric view of a portion of a card shoe with one of the playing cards of FIG. 11 positioned relative to a transmitting and receiving antennas and an radio frequency barrier to be read one at a time.
Figure 18:
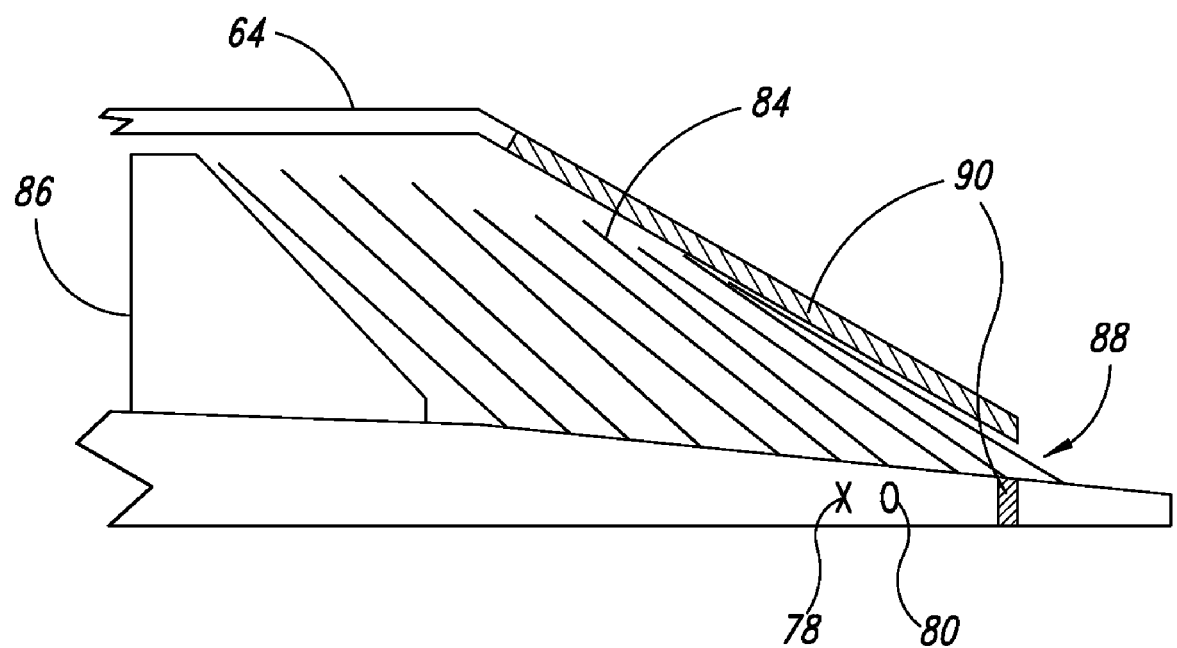
FIG. 18 is a partial cross-section view of a portion of the playing card shoe according to another illustrated embodiment where a first antenna is positioned to electro-magnetically interrogate a number of the playing cards in the receptacle simultaneously.

FIG. 17 shows one of the playing cards 10b of FIG. 11, positioned in a playing card reader such as the card shoe 64 or discard shoe 58. In this embodiment, the playing cards are read one at a time while in the card shoe 64 or discard shoe 58.

a card shoe 64 including a plurality of playing cards84 and a block of weight 86 for urging the playing cards 84 towards a slot 88. A portion 90 of the card shoe 64 may be formed of a radio frequency impervious, resistant or absorbent material, thereby forming an RF barrier. One or more antennas 78, 80 may be positioned to electro-magnetically interrogate a number of the playing cards in the receptacle simultaneously.

Although specific embodiments of and examples for the wireless monitoring system and methods are described herein for illustrative purposes, various equivalent modifications can be made without departing from the spirit and scope of the invention, as will be recognized by those skilled in the relevant art. The teachings provided herein can be applied to other wireless monitoring systems, not necessarily the exemplary blackjack wireless monitoring system described above.

The various embodiments described above can be combined to provide further embodiments. All of the above U.S. patents, patent applications and publications referred to in this specification are incorporated herein by reference, in their entirety, including but not limited to U.S. Pat. No. 6,460,848, filed Dec. 30, 1999, entitled "METHOD AND APPARATUS FOR MONITORING CASINOS AND GAMING"; U.S. patent application Ser. No. 09/849,456, filed May 4, 2001, entitled "METHOD, APPARATUS AND ARTICLE FOR VERIFYING CARD GAMES, SUCH AS BLACKJACK"; and U.S. patent application Ser. No. 09/790,480, filed Feb. 21, 2001, entitled "METHOD, APPARATUS AND ARTICLE FOR EVALUATING CARD GAMES, SUCH AS BLACKJACK". Aspects of the invention can be modified, if necessary, to employ systems, circuits and concepts of the various patents, applications and publications to provide yet further embodiments of the invention.

The system may employ a transceiver rather than separate transmitter and receivers, and may employ common antennas. The methods may include additional steps, eliminate steps, and perform the steps in different orders. The playing cards can include additional layers, including protective coatings. These and other changes can be made to the invention in light of the above-detailed description. In general, in the following claims, the terms used should not be construed to limit the invention to the specific embodiments disclosed in the specification and the claims, but should be construed to include all wireless monitoring systems to track playing cards and/or wagers. Accordingly, the invention is not limited by the disclosure, but instead its scope is to be determined entirely by the following claims.

We claim:

1. A playing card reader, comprising:
    a housing having a receptacle sized to receive a plurality of playing cards;
    a transmitter received in the housing;
    a receiver received in the housing;
    at least a first antenna electrically coupled to at least one of the transmitter and the receiver, the first antenna positioned to electro-magnetically interrogate at least some of the playing cards; and
    a computer-readable medium storing a mapping that uniquely identifies playing cards based on a random distribution of conductive material carried by each of the playing cards, wherein at least one of a number of aspects of the conductive material carried by each playing card corresponds to a respective rank or suit of the respective playing card, the number of aspects of the conductive material including the number and size of the conductive material.

2. The reader of claim 1 wherein the first antenna is positioned to electro-magnetically interrogate the playing cards one at a time, as each of the playing cards is removed from the housing.

3. The reader of claim 1 wherein at least a portion of the housing comprises a radio frequency barrier positioned between the receptacle and an exit of the housing, and the first antenna is positioned with respect to the radio frequency baffler and the exit to electro-magnetically interrogate the playing cards one at a time, as each of the playing cards is removed from the housing.

4. The reader of claim 1 wherein the first antenna is positioned to electro-magnetically interrogate a number of the playing cards in the receptacle simultaneously.

5. The reader of claim 1 wherein the first antenna is positioned to electro-magnetically interrogate the playing cards one at a time, as each of the playing cards is in the receptacle.

6. The reader of claim 1 wherein the transmitter and the receiver take the form of a transceiver.

7. A system for wirelessly monitoring wagering and play of a playing card game at a gaming table using playing cards and wagering chips each bearing conductive material, the system comprising:
   a card reader having a wireless transmitter and receiver coupled to at least a first antenna to electro-magnetically interrogate playing cards;
   a chip reader having at least one wireless transmitter and receiver coupled to a plurality of antennas positioned proximate to respective wagering placement areas to electro-magnetically interrogate wagering chips placed at the wager placement areas, if any; and
   a computing system coupled to receive data from both the wireless card reader and the wireless chip reader, the computer system including a computer-readable medium storing a mapping that uniquely identifies playing cards based on a random distribution of conductive material carried by each of the playing cards, wherein at least one of a number of aspects of the conductive material carried by each playing card corresponds to a respective rank or suit of the respective playing card, the number of aspects of the conductive material including the number and size of the conductive material.

8. The system of claim 7, further comprising:
a card shoe having a receptacle sized and dimensioned for holding a plurality of playing cards, wherein the card reader is housed in the card shoe.

9. The system of claim 7, further comprising:
a chip tray; and
a chip tray reader having at least one wireless transmitter and receiver coupled to at a plurality of antennas positioned in the chip tray to electro-magnetically interrogate wagering chips placed at the chip tray, if any, the chip tray reader coupled to the computing system to provide data thereto.

10. The system of claim 7, further comprising:
a dealer's hand reader having at least one wireless transmitter and receiver coupled to at a plurality of antennas positioned to electro-magnetically interrogate at least one playing card forming a dealer's initial hand when positioned proximate thereto, the dealer's hand reader coupled to the computing system to provide data thereto.

\* \* \* \* \*